United States Patent [19]

Pleuse et al.

[11] Patent Number: 4,791,142
[45] Date of Patent: Dec. 13, 1988

[54] METHOD AND APPARATUS FOR PRODUCING A FOAM FROM A MOLTEN THERMOPLASTIC MATERIAL

[75] Inventors: Harald Pleuse, Langenfeld, Fed. Rep. of Germany; Peter E. Muller, Reinach, Switzerland

[73] Assignee: Nordson Corporation, Westlake, Ohio

[21] Appl. No.: 82,042

[22] Filed: Aug. 5, 1987

Related U.S. Application Data

[62] Division of Ser. No. 798,106, Nov. 14, 1985, abandoned.

[51] Int. Cl.⁴ .............................................. C08G 85/00
[52] U.S. Cl. ........................................ 521/50; 521/56; 521/60; 521/78; 521/79; 521/119; 521/133; 252/307; 264/41; 264/50; 264/53; 264/54
[58] Field of Search ................... 521/50, 56, 60, 78, 521/79, 119, 133; 252/307; 264/41, 50, 53, 54

[56] References Cited

U.S. PATENT DOCUMENTS

| | | |
|---|---|---|
| 2,715,045 | 8/1955 | Thompson . |
| 2,974,723 | 3/1961 | Blanchard . |
| 3,322,684 | 5/1967 | Gibson et al. . |
| 3,744,775 | 7/1973 | Greenberg . |
| 3,784,111 | 1/1974 | Piggott . |
| 3,974,965 | 8/1976 | Miller . |
| 4,006,845 | 2/1977 | Scholl et al. . |
| 4,059,466 | 11/1977 | Scholl et al. . |
| 4,059,714 | 11/1977 | Scholl et al. . |
| 4,184,615 | 1/1980 | Wright . |
| 4,193,745 | 3/1980 | Hamilton et al. . |
| 4,200,207 | 4/1980 | Akers et al. . |
| 4,264,214 | 4/1981 | Scholl et al. . |
| 4,396,529 | 8/1983 | Price et al. . |
| 4,405,063 | 9/1983 | Wydro et al. . |
| 4,423,161 | 12/1983 | Cobbs, Jr. et al. . |
| 4,429,834 | 2/1984 | Ito . |
| 4,505,406 | 3/1985 | Cobbs, Jr. et al. . |

FOREIGN PATENT DOCUMENTS

| | | |
|---|---|---|
| 1217342 | 12/1955 | Fed. Rep. of Germany . |
| 937178 | 8/1948 | France . |
| 2321318 | 3/1977 | France . |
| WO83/04040 | 11/1983 | PCT Int'l Appl. . |
| 956980 | 9/1982 | U.S.S.R. . |

Primary Examiner—John Kight
Assistant Examiner—S. A. Acquah
Attorney, Agent, or Firm—Wood, Herron & Evans

[57] ABSTRACT

A method and apparatus for creating molten thermoplastic material foam by separately pressurizing the molten thermoplastic material and a gas and by delivering that material and gas sequentially to a premixing chamber, through a sintered metal insert and a post mixing chamber, to a discharge orifice of a spray nozzle. The apparatus for practicing this method comprises a nozzle assembly, including a nozzle adaptor and a nozzle, the adaptor of which has flow passages for delivering the pressurized gas and molten material to a premixing cavity and subsequently to and through a sintered metal insert contained within the nozzle.

6 Claims, 1 Drawing Sheet

METHOD AND APPARATUS FOR PRODUCING A FOAM FROM A MOLTEN THERMOPLASTIC MATERIAL

This is a division of application Ser. No. 798,106, filed Nov. 14, 1985, now abandoned.

This invention relates to the production of foamed molten thermoplastic material and more particularly, to a method and apparatus for inexpensively generating a homogeneous stream of molten thermoplastic material having minute gas bubbles evenly disbursed throughout the molten material.

The production of foamed molten thermoplastic material or so-called "hot melt" foams is the subject of U.S. Pat. Nos. 4,059,466 and 4,059,714. Both issued on Nov. 22, 1977 and are assigned to the assignee of this application. According to the disclosure of both of the above-identified patents, a gas, such as carbon dioxide, nitrogen, or air, is forced under pressure into solution with molten thermoplastic material by passage of the gas and the molten material through the intertooth spaces of gear pumps. That solution of molten thermoplastic material and gas is then transported to and through a dispensing gun. Upon emergence of the solution from the nozzle of the gun, the gas comes out of solution and creates the molten thermoplastic material foam.

In U.S. Pat. No. 4,264,214, issued Apr. 28, 1981, and also assigned to the assignee of this application, there is disclosed another apparatus for producing molten thermoplastic material foams. That apparatus comprises a gear motor located directly adjacent the nozzle of a dispenser wherein the pressure of the molten thermoplastic material effects rotation of the gears of the motor and thereby causes a gas supplied to the intertooth spaces of the gears to be forced into solution with the molten thermoplastic material so that upon emergence of the gas/liquid solution from the nozzle of the dispenser, the gas comes out of solution and forms a "hot melt" foam.

All of the apparatus disclosed in the three above-identified patents require either a gear motor or a gear pump for forcing the gas into solution with the molten thermoplastic material before that gas/liquid solution is dispensed from the nozzle of a dispenser to create the hot melt foam.

The weight, size and cost of the motor driven pump or of the motor of the first three of the above-identified patents is often a disadvantage and inhibits the application of the apparatus disclosed in these patents. Furthermore, it is often difficult to obtain a homogeneous flow of foam material from a dispenser nozzle utilizing the equipment disclosed in these patents.

In U.S. Pat. No. 4,396,529, which issued Aug. 2, 1983 and is also assigned to the assignee of this application, there is disclosed an apparatus for creating molten thermoplastic material foam without the use of pumps or motors or any moving parts at all except for valve elements for controlling flow of the molten thermoplastic material/gas from a dispenser of the apparatus. According to the disclosure of this patent, gas at a pressure greater than that of the pressurized molten thermoplastic material is supplied to a dispenser immediately upstream of the dispenser. That gas is introduced into the stream of molten thermoplastic material passing through the dispenser via minute passages which extend in substantially a right angular direction with respect to the direction of flow of the molten thermoplastic material. The liquid velocity in the dispenser at the point of introduction of the gas is relatively high so as to segment the gas stream into tiny microbubbles homogeneously dispersed in the liquid. That microbubble containing liquid stream is then discharged through a restricted discharge orifice of a nozzle of the dispenser so as to create a molten thermoplastic material foam.

The static foaming equipment disclosed in this last of the four above-identified patents is substantially less expensive than the gear motor or gear pump foam generating equipment disclosed in the three earlier patents. But that static foaming equipment does not always generate as high quality and consistent a foam as is required for particular applications. Furthermore, the size and cost of this static foam generator often inhibits its use.

It has therefore been an objective of this invention to provide an improved, inexpensive static foam generator for creating a consistent, high quality stream of gas containing molten thermoplastic material.

Still another objective of this invention has been to provide an attachment which may be added to the end of a molten thermoplastic material dispensing gun so as to convert that gun from one for dispensing a solid stream of molten thermoplastic material to one for dispensing that same molten thermoplastic material in a foamed state.

These objectives are achieved and this invention is predicated upon the concept of introducing gas into a stream of molten thermoplastic material between the dispensing gun and the nozzle of that gun and then passing that gas/molten thermoplastic material mixture through a sintered metal insert mounted within the nozzle of the gun. The gas/molten thermoplastic material mixture is almost instantaneously mixed as it is forced through the sintered metal insert, after which it is extruded from the outlet orifice of the nozzle and, upon emerging from the nozzle orifice, converts to a high quality foam.

The primary advantage of this invention is that it eliminates a substantial quantity of expensive equipment heretofore required to generate high quality molten thermoplastic material foam. This invention also has the advantage of creating a high quality foam in an extremely short flow path such that the gas and molten thermoplastic material may be entirely mixed within the length of a nozzle and nozzle adaptor. Consequently, the equipment needed to convert an adhesive molten thermoplastic material dispenser from one which dispenses molten liquid material to one which dispenses that same material in a foamed state is minimal.

These and other objects and advantages of this invention will be more readily apparent from the following description of the drawings in which.

Figure 1:
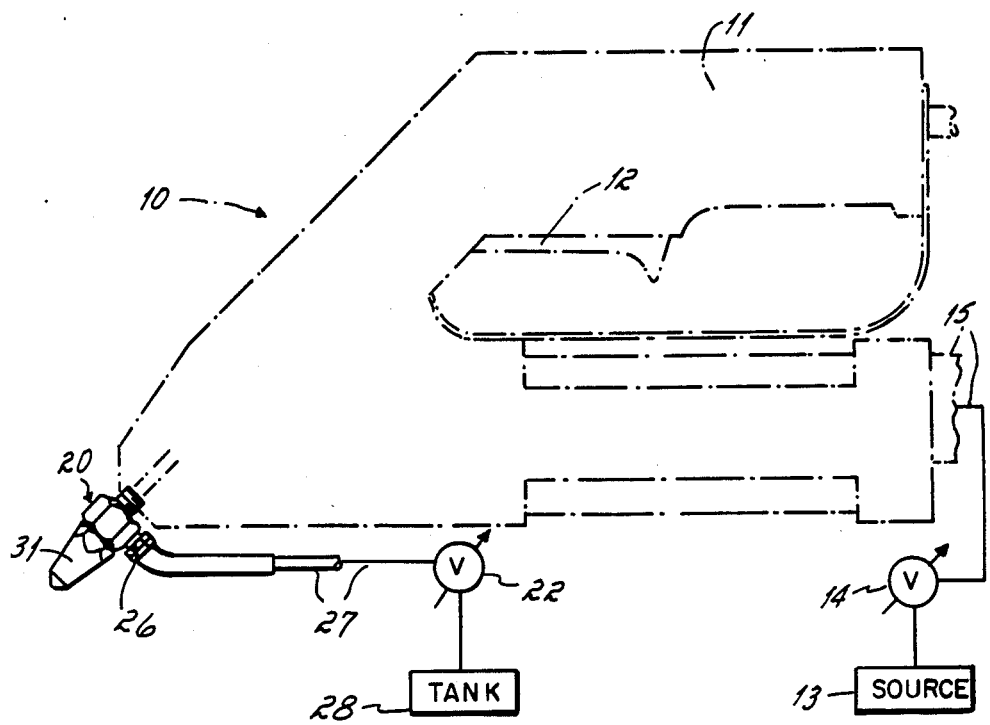
FIG. 1 is a side elevational view, partially in phantom, of a dispensing system incorporating the invention of this application.

With reference to the drawings, a molten thermoplastic dispensing gun or so-called "hot melt" dispensing gun 10 is shown in phantom. The particular gun illustrated in the drawings is a conventional commercially available gun which is fully disclosed in U.S. Pat. No. 4,006,845. For purposes of completing the disclosure of this application, the disclosure of that patent is hereby incorporated by reference.

The gun 10 includes a hand grip portion 11 having a finger operated trigger 12 for operating a valve (not shown), which in turn controls flow of molten thermoplastic material or "hot melt" material through the gun. High pressure molten thermoplastic material is supplied to the gun from a source 13 through a pressure regulator 14 via a conventional heated hose 15. That molten thermoplastic material flows through the gun upon opening of the valve (not shown) contained therein. Upon opening of that valve, the molten thermoplastic material flows into and through an axial liquid flow passage 21 of an adaptor 20 attached to the forward end of the gun 10.

The adaptor 20 has an externally threaded rear section received within a matingly threaded section of the gun 10. At the forward end of the adaptor, the axial liquid flow passage 21 opens into a substantially larger diameter premixing chamber 23. Within this premixing chamber 23, molten thermoplastic material supplied to the chamber 23 via the axial liquid flow passage 21 is premixed with gas. That gas is conventionally either air, carbon dioxide, or nitrogen. The gas is supplied to the premixing chamber 23 via a transverse passage 24 in the adaptor 20 which intersects the axial flow passage 21 of the adaptor upstream of the premixing chamber 23. The transverse passage 24 is connected to a source 28 of high pressure gas via a bore 25 of the adaptor, a conventional gas line fitting 26, and a gas conduit 27. The conduit 27 contains a pressure regulator valve 22 operative to maintain the pressure of the gas supplied to the adaptor 20 at a pressure above the pressure of the molten thermoplastic material. The molten thermoplastic material is usually supplied to the gun 10 at a pressure on the order of 300 to 700 p.s.i., depending upon the particular material and its melting temperature, as well as its optimum application temperature. The gas supplied via the conduit 27 to the adaptor 20 is maintained at a pressure greater than the pressure of the molten material to ensure that the molten material does not flow backwardly through the passage 24 into the conduit 27. In practice, the pressure of the gas in the line 27 is usually maintained at a pressure on the order of 100 p.s.i. greater than the liquid pressure in the conduit 21.

Figure 2:
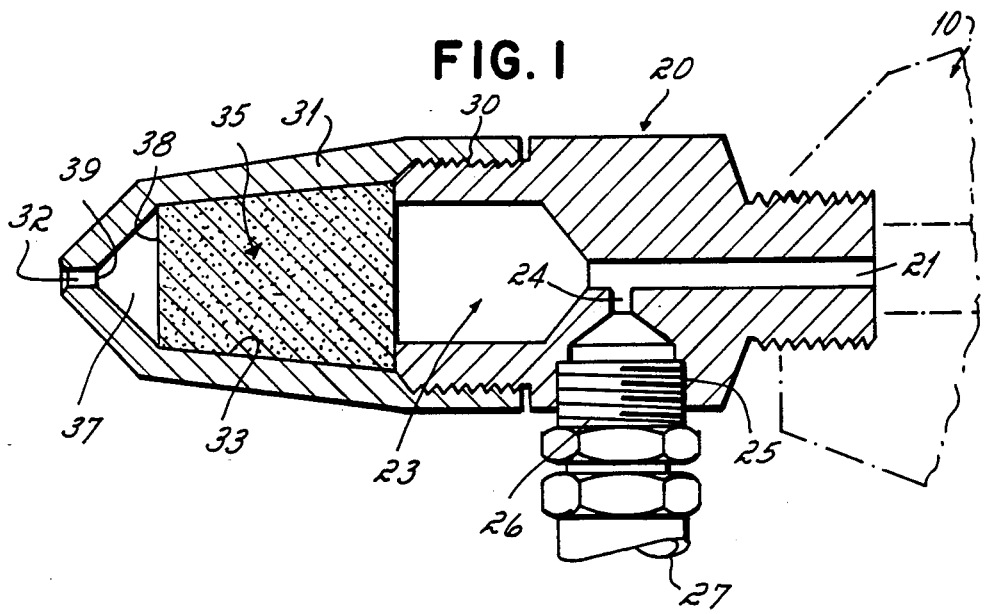
FIG. 2 is an axial cross sectional view through the nozzle (solid area) of FIG. 1.

The forward end of the adaptor 20 is externally threaded as indicated at 30 for reception of a nozzle 31. This nozzle is internally threaded at its rearward end and is mounted over the threads 30 at the forward end of the adaptor 20. An axial cavity extends from the rearward end of the nozzle to a discharge orifice 32 at the forward end of the nozzle. As may be seen most clearly in FIG. 2, this cavity 33 is tapered inwardly from its rearward end toward the discharge orifice 32. Contained within this tapered cavity 33 there is a sintered metal insert 35. In one preferred embodiment, this insert is made from sintered stainless steel of 100 micrometer grain size (0.1 millimeter grain size). Any sintered metal may be used for the insert so long as the grain size of the material from which the insert is made permits relatively unrestricted flow of the molten thermoplastic material therethrough. Of course, the material employed in the sintered metal insert, as well as its porosity, is a function of the molten thermoplastic material to be foamed by this insert.

At its forward end, the insert 35 terminates short of the discharge orifice 32 of the nozzle 31. Consequently, there is a relatively small post mixing cavity 37 between the forward wall 38 of the insert 35 and the rearward end 39 of the discharge orifice 32.

In use of the foaming apparatus described hereinabove, molten thermoplastic adhesive is supplied from the source 13 through the pressure regulator valve 14 to the gun 10. This molten thermoplastic material is usually supplied to the gun at a pressure on the order of 300 to 700 p.s.i., as measured at the valve 14. Simultaneously, gas, either heated or unheated, is supplied from the source 28 via the pressure regulator valve 22 to the gas inlet passage 24 of the adaptor 20. Upon actuation of the trigger of the gun 10, molten thermoplastic material flows through the axial liquid flow passage 21 of the adaptor and is mixed with gas supplied through the transverse passage 24. That gas/liquid mixture is premixed within the premixing chamber 23 before passage through the sintered metal insert 35. The insert is sufficiently porous as to permit the passage of the molten thermoplastic material therethrough. In the course of passage of the molten thermoplastic material and gas through the sintered metal insert 35, the gas and liquid are thoroughly mixed before emerging into the post mixing chamber 37 and being dispensed from that chamber 37 through the discharge orifice 32 of the nozzle. Upon emergence from the discharge orifice 32, the mixture of gas and molten thermoplastic material expands to create a very homogeneous foam of molten thermoplastic material.

As noted above, the primary advantage of this invention is that with a minimum of equipment, and specifically with only the addition of the adaptor 20 and the sintered metal insert containing nozzle 31, as well as a source of high pressure gas connected to the gas inlet of the adaptor, a dispenser of solid or non-foamed molten thermoplastic material may be converted to one for dispensing that same material, but in a foamed state.

Having described our invention, we claim:

1. A method of creating a molten thermoplastic material foam which comprises:

pressurizing molten thermoplastic material to a pressure substantially greater than atmospheric pressure, separately pressurizing gas to a pressure greater than the pressure of the pressurized molten thermoploastic material, delivering the pressurized molten thermoplastic material and gas through separate passages to a first internal premixing chamber of a nozzle assembly, which nozzle assembly has a discharge orifice, passing the premixed mixture of molten thermoplastic material and gas through a sintered insert contained within a second chamber of said nozzle assembly, and passing the gas and liquid mixture from the second chamber to atmosphere through said discharge orifice of said nozzle assembly whereby a foam of said molten thermoplastic material is generated.

2. The method of claim 1 which further comprises passing said mixture of molten thermoplastic material and gas through a third post mixing chamber of said nozzle assembly after passage through said sintered metal insert and before passage through said discharge orifice.

3. The method of claim 1 which comprises pressurizing said molten thermoplastic material to a pressure of several hundred pounds per square inch of pressure and pressurizing said gas to a pressure greater than the pressure of said molten thermoplastic material before delivering the molten thermoplastic material and gas to said premixing chamber.

4. A method of creating a molten thermoplastic material foam which comprises:

pressurizing molten thermoplastic material to a pressure of several hundred pounds per square inch, separately pressurizing gas to a pressure greater than the pressure of the pressurized molten thermoplastic material, delivering the pressurized molten thermoplastic material and pressurized gas through separate passages to a first internal premixing chamber of a nozzle assembly, which nozzle assembly has a discharge orifice, passing the premixed mixture of molten thermoplastic material and gas through a sintered insert contained within a second chamber of said nozzle assembly, and passing the gas and liquid mixture from the second chamber to atmosphere through said discharge orifice of said nozzle assembly whereby a foam of said molten thermoplastic material is generated.

5. The method of claim 4 wherein said premixed mixture of molten thermoplastic material and gas is passed through a sintered insert which has a grain size of less than 1 millimeter.

6. The method of claim 4 wherein said premixed mixture of molten thermoplastic material and gas is passed through a sintered insert which has a grain size of approximately 0.1 millimeter.

* * * * *